INVENTORS
HENRY A. BERLINER
FRANK B. LANE
WILLIAM L. GREENE
BY CLARENCE J. CLEMENTS, JR.
Bacon & Thomas ATTORNEYS United States Patent Office 3,165,807
Patented Jan. 19, 1965

3,165,807
APPARATUS FOR HANDLING EXTRUDED CEMENTITIOUS MATERIAL AND THE LIKE
Henry A. Berliner, Washington, D.C., and Frank B. Lane and William L. Greene, Annapolis, and Clarence J. Clements, Silver Spring, Md., assignors, by mesne assignments, to Institut International Financier, a Liechtenstein corporation
Filed Dec. 29, 1961, Ser. No. 163,294
13 Claims. (Cl. 25—11)

This invention relates generally to material-handling equipment and more specifically to means for handling cementitious material and the like as it is delivered from an extruding machine in uncured condition.

Many difficulties have been encountered in handling extruded material such as concrete when a true extrusion process is used. This is to be distinguished from a slipform type of process which is sometimes called extrusion but is actually a refinement of the conventional molding techniques. Where a true extrusion machine is employed and the cementitious material is formed as it is delivered from the die orifice thereof, the material is normally delivered onto a smooth stationary surface and only short extrusions can be made satisfactorily. If the length of the extrusion increases, the force required to move the extrusion along the surface becomes greater and the resultant resistance distorts the shape of the product as it emerges from the die orifice. This progressive increase in resistance, coupled with the normal variations in the speed of flow experienced at the die orifice, results in an extrusion of irregular cross section.

Furthermore, no provision has been made for handling material once it has been extruded and commercial extruders have, therefore, been forced to shut down their machine entirely after each short length is extruded while conventional hoist means is employed to remove the extrusion from the path of the extrusion machine and set it aside to cure. Such methods have been found to be not only time-consuming and expensive but also tend to increase the incidence of distortion and breaking, due to the fact that each extrusion is handled individually.

It is, therefore, a primary object of the present invention to provide means for receiving material delivered from an extrusion machine and for removing this material from the die orifice at the same rate as it emerges therefrom.

Another primary object is to provide means for receiving extrusions of great length in quick sequence and removing them from the path of the extrusion machine for curing.

Another important object is to provide means for conveniently handling cementitious material or the like when it is in an uncured condition after extrusion, and for storing the material while it is being cured and afterwards.

Another object is to provide handling apparatus of the type referred to which is inexpensive in cost, reliable in use and durable in operation.

Other objects and advantages will be apparent from the following description, when read in conjunction with the accompanying drawings, in which.

Figure 1:
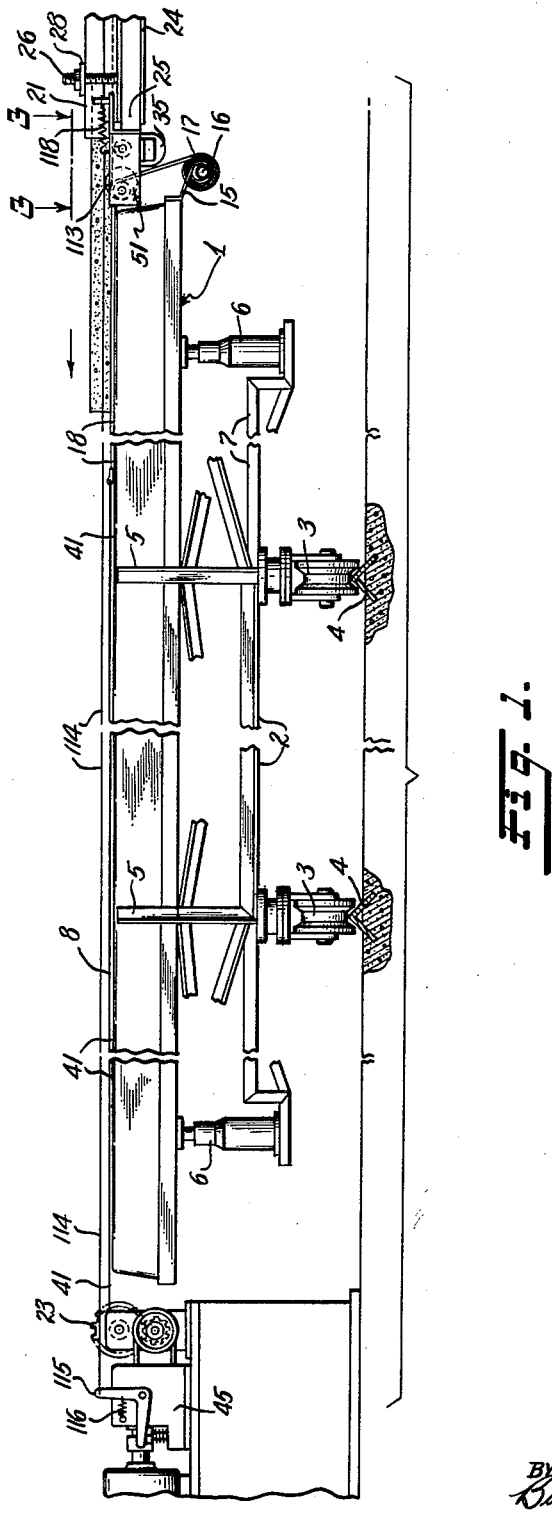
FIG. 1 is a side elevational view illustrating handling apparatus incorporating the principles of the present invention.
Figure 2:
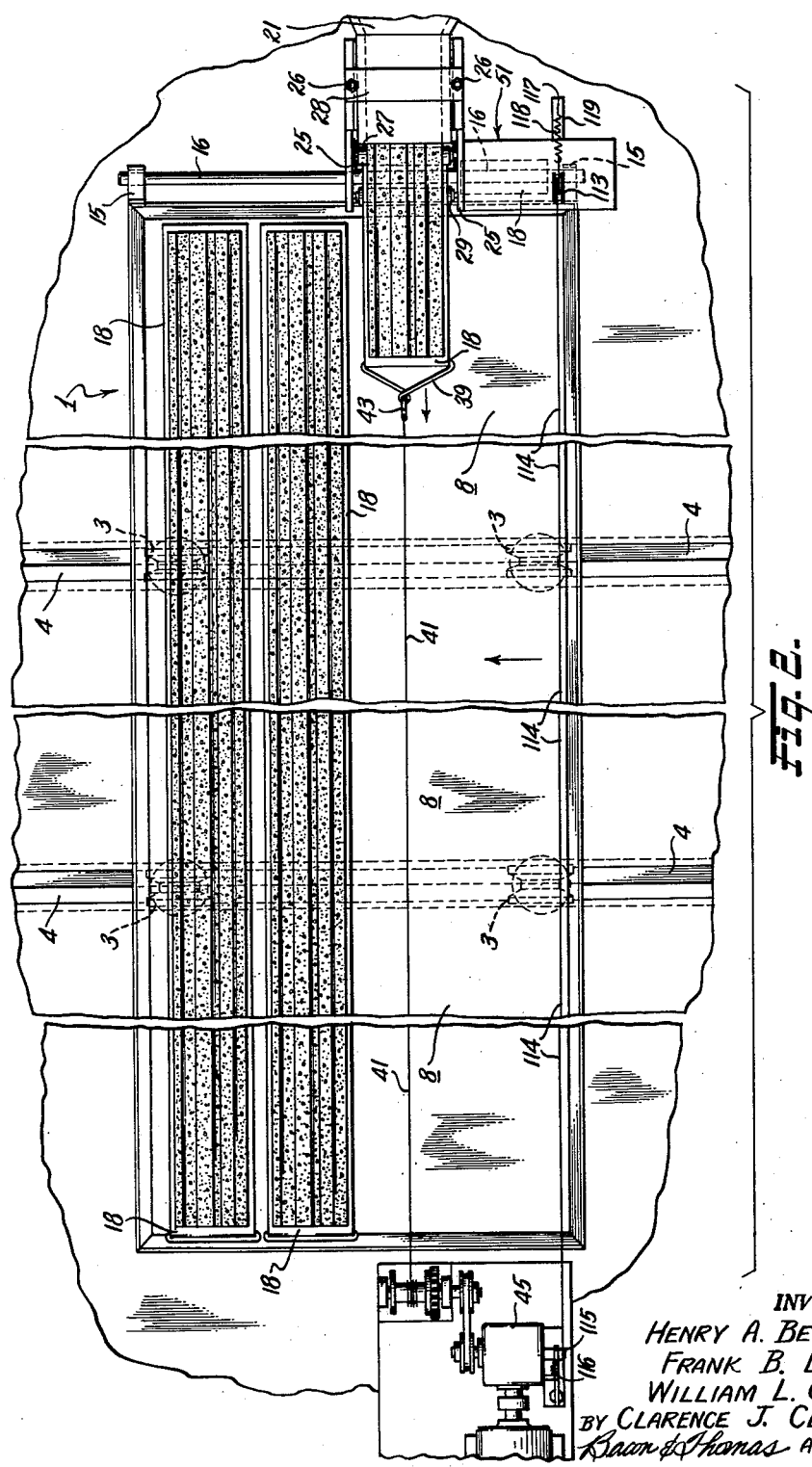
FIG. 2 is a top plan view of the apparatus illustrated in FIG. 1.
Figure 3:
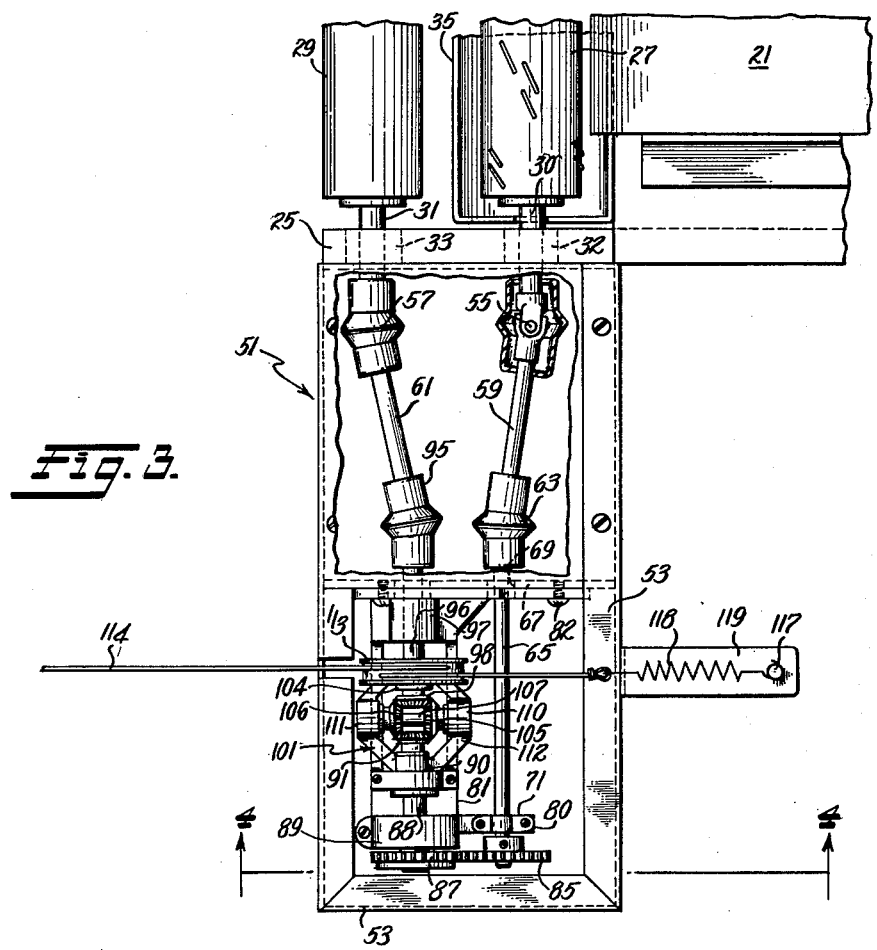
FIG. 3 is a fragmentary plan view taken on the line 3—3 of FIG. 1, portions of the structure being cut away to disclose structural details.
Figure 4:
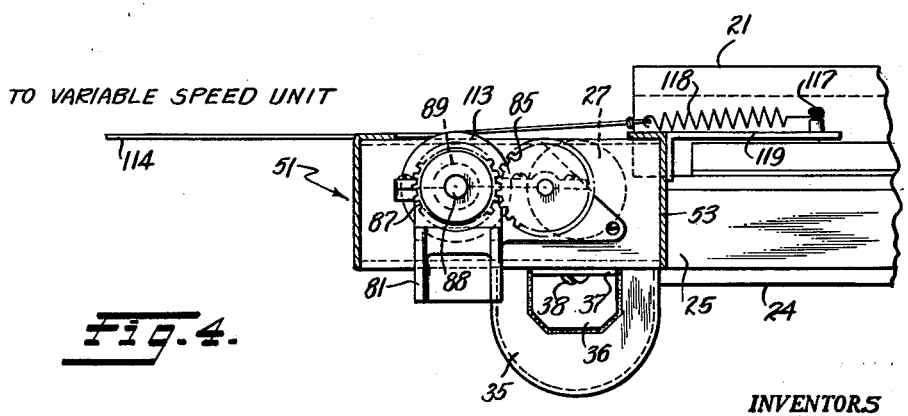
FIG. 4 is a sectional view taken on the line 4—4 of FIG. 3.

Referring now more specifically to the drawings, a table, generally indicated by the numeral 1, is mounted on a carriage or trolley 2, which is supported by means of wheels 3 riding on transverse track members 4. The table 1 comprises a plurality of legs 5 whereby a series of similar tables may be stacked in vertically spaced relation with the legs of one supported on the upper surface of the next succeeding table at the outer extremities thereof. Jack elements 6 are mounted on the carriage frame 7 and are adapted to bear against the undersurface of table 1 so that the upper surface 8 thereof can be conveniently leveled at the desired height.

At one end of the table, a plurality of brackets 15 serve to mount one or more reels 16 which support a plurality of rolls 17 of Teflon belt material or the like. The free ends of rolls 17 are adapted ot be selectively trained across the upper surface 8 of table 1 to serve as conveyor belts, as indicated by the numeral 18.

The table 1, when in operative position, is disposed longitudinally between the die orifice 21 of an extrusion machine and an aligned, longitudinally spaced pulley 23. A pair of arms 25 extend forwardly from the die member at either side thereof and serve to mount a pair of rollers 27 and 29. The arms 25 are fixed on either side of a supporting platform 24, as by welding or the like. Supporting platform 24 underlies the die member 21 and is supported by means of bolts 26 fastened to a transverse member 28 overlying the die member.

The rollers 27 and 29 are mounted on shafts 30 and 31, respectively, journaled in the arms 25 by bearings 32 and 33 respectively. The roller 27 may have a roughened peripheral surface and is disposed with its upper level slightly above the lower level of the die orifice so that extruded material delivered from the die orifice passes over the roller 27 and rotates the same in accordance with the speed of the material itself.

A pan 35 is provided below the roller 27 and contains enough water so that the lower portion of roller 27 is immersed therein. Thus, any accumulation of material on the roller 27 is washed off as the roller rotates. The pan may be conveniently secured to the arms 25 by means of brackets 36 secured, as by welding, at either end of the pan and having flanges 37 attached below arms 25 by means of screws 38.

The free end of a selected belt 18 is threaded between the two rollers, passing over roller 29 and onto the upper surface 8 of the table 1. The leading edges of belts 18 are provided with attachment means, such as rigid wire loops 39. A wire 41 mounted on the pulley 23 has a hook 43 adapted to selectively engage the loop members 39. The pulley itself is driven by a motor M through a variable speed drive connection 45. Thus, when the hook 43 is connected to the loop 39 of a selected belt 18 adjacent the roller 29, the belt may be drawn across the table as the material is being extruded to convey the material away from the die orifice.

When one length of material has been extruded in this manner it is severed by any suitable means whereupon the hook 43 is detached and the table 1 is moved transversely along rails 4 until the next belt is in alignement. The hook 43 is then attached to the loop 39 of the next succeeding belt 18 and the process is repeated until a plurality of lengths of material have been extruded onto the table. After the table 1 has been substantially filled by extruding lengths of material onto all of the belts 18 thereof, it may be removed from the carriage 2 and replaced by another table. Successive tables loaded in this manner are stacked in superposed relation, spaced vertically by the legs 5, while the extruded material is being cured, or until it is ready for shipment or use.

It is particularly important that the speed of the belt 18 be synchronized with the speed of the material as it emerges from the die orifice. If the belt 18 is not being moved at a great enough speed, the material tends to pile up, resulting in an uneven, unstable extrusion. If it is moving too slowly, the material tends to separate, resulting in cracks or other weaknesses in the material. For this purpose, a synchronizing unit 51 is mounted adjacent the die member on one of the arms 25. Unit 51 comprises a rectangular frame 53 formed of angle iron or the like. The shafts 30 and 31 extend into the inner portion of the frame 53 and are connected by universal joints 55 and 57, respectively to converging shafts 59 and 61, respectively. The outer end of shaft 59 is connected by a universal joint 63 to an outer shaft 65 having one end portion journaled in a transverse frame member 67, as by bearing 69. The outer end portion of the shaft 65 is mounted in a bearing 71 secured by means of a bracket 80 to the rear of an outwardly extending support casting 81. The support casting 81 is in turn secured at its inner end to the transverse frame member 67, as by screws 82. A gear 85 is mounted at the outer end of shaft 65 in driving engagement with a forward gear 87. Gear 87 is in turn mounted on a shaft 88 which is rotatably mounted above support casting 81 by means of bearing supports 89 and 90. At the inner end of shaft 88 is mounted a differential bevel gear 91, driven by roller 27 through shaft 88, gear 87, gear 85, shafts 65 and 59, and shaft 30.

The inner end of shaft 61 is connected by a universal joint 95 to a shaft 96. The shaft 96 extends through transverse frame member 67 and is journaled in a raised boss 97 formed on the inner end of support casting 81. A differential bevel gear 98 is fixed on the outer end of shaft 96 in opposed relation to the driven differential gear 91, and this gear is driven by the roller 29 through shafts 96, 61 and 31.

A differential unit 101 is rotatably mounted adjacent the opposed inner ends of shafts 88 and 96 by collars 103 and 104 respectively. A pair of idler bevel gears 105 and 106 are mounted in opposed relation on a common shaft 107 extending perpendicularly to the axes of shafts 88 and 96 between bosses 110 and 111 on the frame 112 of the differential unit 101. The opposite edges of each of said idler gears are drivingly engaged with the adjacent edges of the driven gears 91 and 98. A reel 113 is fixedly mounted on the collar 104 and a line 114 of wire or the like extends between reel 113 and a control lever 115 on the variable speed unit 45. The control lever 115 is normally biased in one direction by a spring 116 and the line 114 is wound about reel 113 and has its opposite end connected to a fixed post 117 through a spring 118 tending to pull the line in the opposite direction. The post 117 is mounted on a bracket 119 secured behind the frame 53. When the speed of the material being extruded is equal to the speed of the belt 18, driven gears 91 and 98 rotate at the same speed and the differential unit 101 is stationary. If the speed of the material increases or decreases, the speeds of driven gears 91 and 98 vary accordingly, and this effects a rotation of the differential unit 101 and reel 113, tending to move the control lever 115 forwardly or rearwardly. The control lever in turn adjusts the speed of the belt 18 until it is moving at the same rate as the material being extruded.

The foregoing synchronization unit has been tested extensively in using the present system for the extrusion of cementitious material and the like. In this field the uncured material being extruded is particularly susceptible to being deformed or cracked unless it is removed from the orifice at the same rate it is delivered therethrough. The present speed synchronization system effects an immediate adjustment of the speed of the belt, and no difficulties have been found in extruding great lengths of material of uniform cross section and uniform degrees of compactness.

It will accordingly be recognized that the present invention fully achieves the object and advantages set forth hereinabove. Numerous modifications, changes and adaptations may be made without departing from the spirit of the invention or the scope of the annexed claims.

We claim:

1. Apparatus for handling extruded material delivered from the die orifice of an extrusion machine, comprising: table means providing an upper supporting surface with one end of said table disposed adjacent to said die orifice and substantially at the same level as the bottom extremity of said orifice; and a plurality of conveyor belt means mounted on reels positioned at said one end of said table in side-by-side relation and each having free ends extending from said reels; means for training the free ends of said belts onto said supporting surface for movement therealong in longitudinally directed paths, said table being transversely moveable to bring successive ones of said longitudinal paths into longitudinal alignment with said die orifice, whereby a plurality of lengths of said extruded material can be delivered onto said supporting surface in side-by-side relation.

2. The apparatus of claim 1 wherein said belts are trained over pulleys mounted above the respective reels, the upper surface of each pulley being on substantially the same level as said upper supporting surface.

3. The apparatus of claim 2 wherein said pulleys are mounted on brackets extending forwardly from said extrusion machine and said reels are mounted at a lower level on brackets fixed to the adjacent end of said table.

4. Apparatus for handling extruded material delivered from the die orifice of an extrusion machine, comprising: a carriage; table means removably mounted on said carriage and providing an upper supporting surface with one end disposed adjacent to said die orifice and substantially at the same level as the bottom extremity of said orifice; and a plurality of belt means positioned on said table in side-by-side relation and adapted to move over said surface in the direction of the other end of said table, said carriage being transversely moveable to shift said table laterally and bring successive ones of said plurality of belts into longitudinal alignment with said die orifice, whereby a plurality of lengths of said extruded material can be delivered onto said supporting surface in side-by-side relation.

5. The apparatus of claim 4 wherein said carriage is mounted on wheels.

6. The apparatus of claim 5 wherein said wheels are positioned on transverse rails.

7. The apparatus of claim 4 herein said table is provided with a plurality of legs whereby a series of tables may be stacked in vertically spaced relation when loaded.

8. The apparatus of claim 4 wherein adjustment means are provided between said carriage and said table means to bring the upper surface of said table means to the desired level and angle of disposition.

9. Apparatus for handling extruded material delivered from the die orifice of an extrusion machine, comprising: table means providing an upper supporting surface with one end disposed adjacent to said die orifice and substantially at the same level as the bottom extremity of said orifice; and a plurality of conveyor belt means positioned on said table in side-by-side relation and adapted to move over said surface in the direction of the other end of said surface, said supporting surface being transversely moveable to bring successive ones of said plurality of belts into longitudinal alignment with said die orifice, whereby a plurality of lengths of said extruded material can be delivered onto said supporting surface in side-by-side relation.

10. Extending apparatus, comprising: an extruder having a die orifice for the delivery of extruded material; a motor-driven pulley positioned in longitudinal alignment with said die orifice and at a point remote therefrom; table means providing an upper supporting surface with one end disposed adjacent to said die orifice and substantially at the same level as the bottom extremity of said orifice; and a plurality of belt means positioned on said table in side-by-side relation and adapted to move over said surface in the direction of the other end of said table, said supporting surface being transversely moveable to bring successive ones of said plurality of belts into longitudinal alignment with said die orifice and with said pulley; means for selectively attaching said belts to said pulley when in alignment therewith for movement in longitudinal alignment with said die orifice from a point closely adjacent to said die orifice to convey material delivered therefrom; means for detecting the speed of said selected belt; means adjacent said one end of said table for detecting the speed of delivery of said material; and means for adjusting the speed of said pulley automatically in response to a change in speed of delivery of the material to equalize the speed of said material and the speed of said selected belt.

11. Extruder apparatus, comprising: an extruder having a die orifice for the delivery of extruded material; a first roller positioned closely adjacent the open end of said die orifice with its upper level in substantially the same plane as the lower level of said die orifice; a second roller positioned closely adjacent to said first roller and in alignment with said die orifice and said first roller; a conveyor belt trained over said second roller and adapted to convey extruded material delivered thereto across said first roller; drive means for driving said conveyor belt; means connected with said second roller for detecting the speed of said belt in accordance with the speed of said second roller; means connected with said first roller to determine the speed of said extruded material in accordance with the speed at which it drives said first roller; and means for adjusting the speed of said drive means in response to any differential in the respective speeds of said belt.

12. The apparatus of claim 11 wherein said upper level of said first roller is slightly above said lower level of said die orifice.

13. The apparatus of claim 11 wherein a differential unit is mounted adjacent said first and second rollers for rotation about a horizontal axis, said differential unit including a pair of idler bevel gears mounted in opposed relation on a common axis normal to said horizontal axis and pair of driven gears mounted in opposed relation on said horizontal axis with the driven gears being drivingly connected with the idler gears at either side thereof, one of said driven gears being driven by said first roller and the other of said driven gears being driven by said second roller to effect rotation of said unit in response to a differential in the respective speeds of said rollers, and means for varying the speed of said drive means in responsive to rotation of said unit to effect a change in the speed of said conveyor belt which will compensate for a change in speed of the material delivered thereto.

References Cited by the Examiner
UNITED STATES PATENTS

| 885,809 | 4/08 | Waggoner | 25—113 |
| 2,412,979 | 12/46 | Garvey | 25—8 XR |
| 2,916,792 | 12/59 | Crook et al. | 25—11 |
| 2,988,774 | 6/61 | Hely | 18—21 |

FOREIGN PATENTS 1,092,154  11/54  France.

MICHAEL V. BRINDISI, *Primary Examiner.*
ROBERT F. WHITE, *Examiner.*